(12) United States Patent
Daniels et al.

(10) Patent No.: US 12,168,812 B2
(45) Date of Patent: Dec. 17, 2024

(54) PROCESS FOR THE RECOVERY OF METALS FROM POLYMETALLIC NODULES

(71) Applicant: UMICORE, Brussels (BE)

(72) Inventors: Michel Daniels, Olen (BE); Jean Scoyer, Olen (BE); Michael Baltes, Olen (BE); Margot Neven, Olen (BE); Jan Leyssen, Olen (BE)

(73) Assignee: UMICORE, Brussels (BE)

( * ) Notice: Subject to any disclaimer, the term of this patent is extended or adjusted under 35 U.S.C. 154(b) by 853 days.

(21) Appl. No.: 17/415,865

(22) PCT Filed: Dec. 10, 2019

(86) PCT No.: PCT/EP2019/084306
§ 371 (c)(1),
(2) Date: Jun. 18, 2021

(87) PCT Pub. No.: WO2020/126632
PCT Pub. Date: Jun. 25, 2020

(65) Prior Publication Data
US 2022/0074018 A1    Mar. 10, 2022

(30) Foreign Application Priority Data

Dec. 21, 2018  (EP) .................................... 18215028

(51) Int. Cl.
*C22B 3/08*   (2006.01)
*C22B 3/00*   (2006.01)
(Continued)

(52) U.S. Cl.
CPC .................. *C22B 3/08* (2013.01); *C22B 3/44* (2013.01); *C22B 15/0071* (2013.01);
(Continued)

(58) Field of Classification Search
CPC ............ C22B 3/06–10; C22B 15/0071; C22B 47/0063; C22B 47/0081; C22B 47/009
See application file for complete search history.

(56) References Cited

U.S. PATENT DOCUMENTS 3,218,161 A * 11/1965 Kunda ................ C22B 23/0461
423/55
3,906,075 A    9/1975 Menz
(Continued)

FOREIGN PATENT DOCUMENTS

CN    107435100 A    12/2017
JP    2011074406 A *  4/2011
(Continued)

OTHER PUBLICATIONS

Abramovski T.,et al.; "Technologies for the Processing of Polymetallic Nodules From Clarion Clipperton Zone in the Pacific Ocean"; Journal of Chemical Technology and Metallurgy, 52, 2, 2017, 258-269 (Year: 2017).*

(Continued)

*Primary Examiner* — Alexandra M Moore
*Assistant Examiner* — Austin Pollock
(74) *Attorney, Agent, or Firm* — NK Patent Law

(57) ABSTRACT

The present disclosure concerns a process for the recovery of valuable metals from polymetallic nodules. A two-stage process using $SO_2$ in an acidic aqueous media is disclosed. In a first step, performed in mildly acidic conditions, Mn, Ni, and Co are dissolved; in a second, more acidic step, Cu is dissolved. Under these conditions, the leachate of the first step contains most of the Mn, Ni, and Co, while being nearly Cu-free. The Ni and Co are precipitated as sulfides; the Mn can be recovered as sulfate by crystallization. Cu, which is leached in the second step, is selectively precipitated, also as sulfide.

6 Claims, 1 Drawing Sheet

(51) Int. Cl.
  *C22B 3/44* (2006.01)
  *C22B 15/00* (2006.01)
  *C22B 47/00* (2006.01)
(52) U.S. Cl.
  CPC ........ *C22B 23/043* (2013.01); *C22B 23/0469* (2013.01); *C22B 47/0018* (2013.01); *C22B 47/0063* (2013.01)

(56) References Cited

U.S. PATENT DOCUMENTS

| | | | | |
|---|---|---|---|---|
| 4,110,400 | A * | 8/1978 | Jha | C01G 53/11 423/141 |
| 4,138,465 | A * | 2/1979 | Pahlman | C22B 47/0063 75/400 |
| 4,208,379 | A * | 6/1980 | Pahlman | C22B 3/165 423/49 |
| 2012/0103827 | A1 * | 5/2012 | Ruonala | C22B 3/08 205/583 |
| 2016/0304988 | A1 * | 10/2016 | Vaughan | C22B 3/08 |

FOREIGN PATENT DOCUMENTS

| | | | | |
|---|---|---|---|---|
| JP | 2017036489 | A * | 2/2017 | |
| WO | WO-9625361 | A1 * | 8/1996 | C01G 3/10 |
| WO | WO-2007092994 | A1 * | 8/2007 | C22B 23/043 |

OTHER PUBLICATIONS

Shen Wu, Liao Bing, Sun Weiyi, Ding Sanglan, Su Shijun. Experimental study on the preparation of Mn 2 O 3 by pyrolysis of manganese sulfate and leaching of low-grade pyrolusite using pyrolysis tail gas[J]. Journal of Sichuan University (Engineering Science Edition), 2014, 46(2): 177-181. (Year: 2014).*
Stefanova V., et al.; "Copper, Nickel and Cobalt Extraction from FeCuNiCoMn Alloy Obtained after Pyrometallurgical Processing of Deep Sea Nodules"; Proceeding of the Tenth ISOPE Ocean Mining and Gas Hydrates Symposium (Year: 2013).*
Stefanova V., et al.; "Selective dissolution of FeCuNiCoMn Alloy Obtained After Pyrometallurgical Processing of Polymetallic Nodules", Proceedings of The Eighth ISOPE Ocean Mining Symposium, 2009 (Year: 2009).*
Rodriguez M., et al.; "Optimization of the Existing Methods for Recovery of Basic Metals from Polymetallic Nodules"; Proceedings of the Tenth ISOPE Ocean Mining and Gas Hydrates Symposium (Year: 2013).*
Iliev P., et al.; "Sulfuric acid autoclave dissolution of Ni—Co sulfide deposit"; Bulgarian Chemical Communications, vol. 47, Special issue A (pp. 106-111) 2015 (Year: 2015).*
CNIPA; Office Action for Chinese Patent Application No. 201980083866.4 dated Nov. 1, 2022, 7 pages.
ISA/EP; International Search Report and Written Opinion for International Patent Application No. PCT/EP2019/084306 dated Feb. 6, 2020, 9 pages.
WIPO; International Preliminary Report on Patentability for International Patent Application No. PCT/EP2019/084306 dated Jun. 16, 2021, 6 pages.
Abramovski, Tomasz, et al. (2017). Technologies for the Processing of Polymetallic Nodules from Clarion Clipperton Zone in the Pacific Ocean. Journal of Chemical Technology and Metallurgy, 52(2), 258-269. https://dl.uctm.edu/journal/node/j2017-2/14-16_158_V_Stefanova_258_269.pdf.
Acharya, R, et al. (1999). Leaching of Metals from Indian Ocean Nodules in SO2—H2O—H2SO4-(NH4)2SO4 Medium. Elsevier, 53(2), 169-175.
Khalafalla, Sanaa E., at al. (1981). Selective Extraction of Metals from Pacific Sea Nodules with Dissolved Sulfur Dioxide. Journal of Metals, 37-42. (Cited in ISR as Khalafalla Sanaa E et al: "Selective Extraction of Metals from Pacific Sea Nodules with Dissolved Sulfur Dioxide", Journal of Metals, Springer-Verlag, New York, vol. 33, No. 8, Dec. 20, 2013 (Dec. 20, 2013), pp. 37-42, XP035303069, ISSN: 0148-6608, DOI: 10.1007/BF03339471 [retrieved on Dec. 20, 2013]).

* cited by examiner

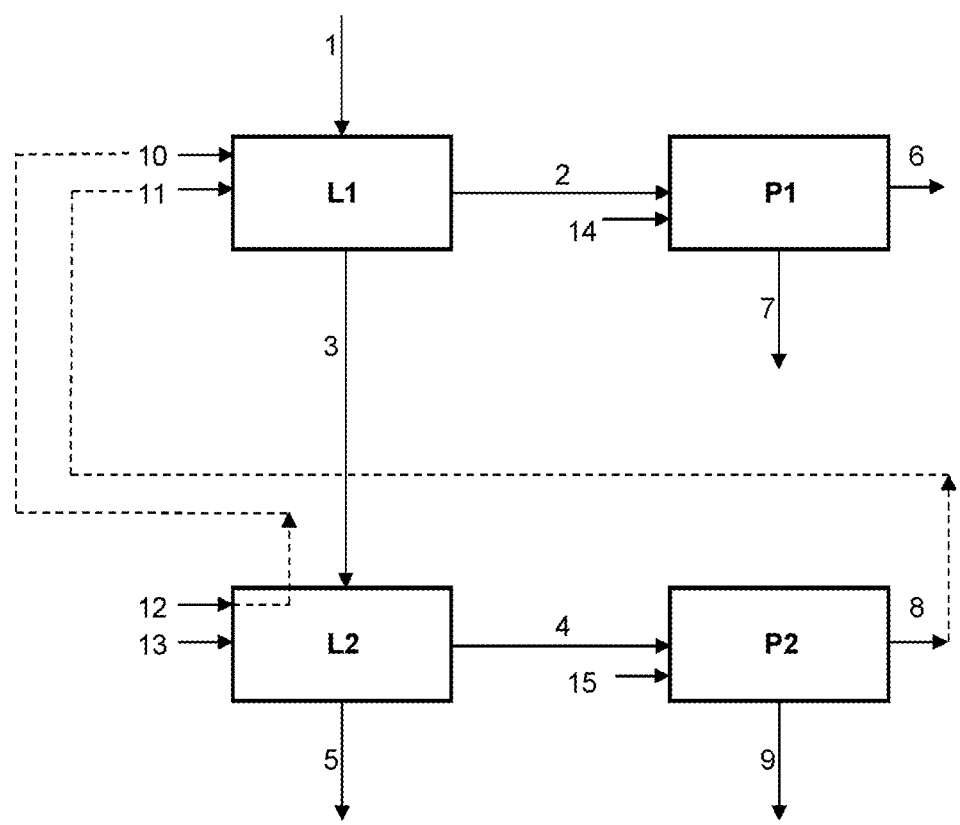

PROCESS FOR THE RECOVERY OF METALS FROM POLYMETALLIC NODULES

CROSS-REFERENCE TO RELATED APPLICATIONS

This application is a U.S. National Stage application of International Patent Application No. PCT/EP2019/084306, filed on Dec. 10, 2019, which claims the benefit of European Patent Application No. 18215028.4, filed on Dec. 21, 2018.

The present disclosure concerns a process for the recovery of valuable metals from polymetallic nodules. Polymetallic nodules, also called deep sea manganese nodules, are rock concretions formed of concentric layers of iron and manganese hydroxides at the bottom of oceans.

To date, the most economically interesting nodules have been found in the Clarion Clipperton Fracture Zone (CCFZ). Nodules in this area typically contain 27% Mn, 1.3% Ni, 1.1% Cu, 0.2% Co, 6% Fe, 6.5% Si, and 3% Al. Other elements of economic interest are Zn, Mo and rare earths.

Since the seventies, many processes have been investigated to treat polymetallic nodules. A recent comprehensive review of the available processes can be found in a paper by T. Abramovski et al., Journal of Chemical Technology and Metallurgy, 52, 2, 2017, 258-269.

Kennecott and INCO attempted to develop industrial processes. Kennecott developed the Cuprion ammoniacal process, while several companies developed hydrometallurgy processes in sulfate, chloride and more recently nitrate media. INCO studied pyrometallurgical process with production of a matte. More recently, production of an alloy has been proposed. None of these processes went further than the piloting scale.

The Cuprion process faces issues with low Co recovery, slow reduction of the nodules by CO gas, and low value of the manganese residue. Sulfate processes derived from lateritic processes making use of autoclave leaching to reject Mn and Fe in the leach residue, face technological issues in the leaching, as well as poor valorization of the Mn. Other sulfate-based processes lead to huge reagent consumption and/or production of fatal ammonium sulfate. Chloride and nitrate routes have high energy consumption for the regeneration of the reagents by pyro-hydrolysis and pyrolysis. Drying of nodules before pyrometallurgy processing leads also to high energy consumption.

The disclosed process intends to solve these issues by means of proven and scalable leaching technologies. This process involves the use of $SO_2$ as leaching agent.

In this context, it should be noted U.S. Pat. No. 3,906,075 discloses a single-step leaching process using $SO_2$ and sulfuric acid. Mn, Ni, Co, and Cu are leached simultaneously. This document also illustrates the crystallization of manganese as $MnSO_4$, followed by its decomposition to oxide, thereby generating $SO_2$ for re-use in the leaching step. Cu needs to be extracted from the single leachate stream. Liquid-liquid extraction is typically used, even though the cost and complexity of this process are considerable in view of the volumes to be treated.

In a similar context, U.S. Pat. No. 4,138,465 discloses that selectivity between Ni, Mn, Co versus Cu can be achieved under well controlled leaching conditions, in particular when using a metered quantity of $SO_2$ fed as sulfurous acid to the leaching step. Noteworthy is that selectivity is only achieved when the material is finely crushed to 100 mesh or finer. Mn, Ni, and Co leach first, leaving a Cu-bearing residue, which is separated and subjected to a second leaching step using a mixture of $CO_2$ and $NH_3$. This process is not particularly robust from an industrial point of view as the precise amount of sulfurous acid needed to dissolve the Ni, Mn, and Co while leaving Cu untouched depends upon the metal content of the material, which is inevitably variable. Any departure from the optimal conditions will lead to impure leachate streams, or to a residue requiring further processing.

The aim of the present disclosure is to provide a process offering selectivity between Mn, Ni, and Co versus Cu in an industrially robust way. This can be achieved using a two-step leaching.

FIG. 1 illustrates the process. The main unit operations are:

L1: First leaching
P1: First precipitation
L2: Second leaching
P2: Second precipitation.

Also shown are the optional recycle of the metal-bearing aqueous phase (8) to the first leaching step (L1), and the optional forwarding of excess of reagent (12) to the first leaching step (L1). These options are represented with dotted lines.

The disclosed process for the recovery of the metals Mn, Ni, Co, and Cu from polymetallic nodules (1), comprises the steps of leaching said metals using an $SO_2$-bearing gas as leaching agent in acidic aqueous conditions, and is characterized in that the leaching is performed according to a two-stage process comprising the steps of:

a first leaching (L1), wherein a major part of the Mn, Ni, and Co is dissolved by contacting the nodules with a first quantity of $SO_2$-bearing gas (10) in a first acidic aqueous solution of sulfuric acid (11) at a pH of 2 to 4, thereby producing a first leach solution (2) and a first leach residue (3), which are separated; and, a second leaching (L2), wherein a major part of the Cu is dissolved by contacting the first leach residue (3) with a second quantity of $SO_2$-bearing gas (12) in a second acidic aqueous solution of sulfuric acid (13) at a pH of less than 1.5, thereby producing a second leach solution (4) and a second residue (5), which are separated.

The first leaching step is performed in mildly acidic conditions, by contacting the nodules (1) with $SO_2$ in a solution of diluted sulfuric acid (11). This will lead to the dissolution of most of Mn, Co, and Ni, while Cu remains essentially in the residue (3). The pH of 2 to 4 is obtained by dosing either of the sulfuric acid in the aqueous solution (11), the $SO_3$ optionally present in the $SO_2$ (10), or the metal-bearing aqueous phase (8) that is optionally recirculated from the second precipitation (P2).

The second leaching step is performed at a more acidic pH, by contacting the first leach residue (3) with $SO_2$ in a solution of diluted sulfuric acid (13). This will lead to the exhaustion of the residue (3) and to the dissolution of Cu in particular. The pH of less than 1.5 is obtained by dosing the sulfuric acid in the aqueous solution (13), or the $SO_3$ optionally present in the $SO_2$ (12).

This approach uses mildly acidic conditions in the first step (L1), ensuring that most of the Mn, Co, and Ni dissolve, while avoiding the dissolution of Cu. This first leach solution (2) preferably contains less than 0.2 g/L Cu, or less than 10% of the Cu in the nodules; it contains more preferably less than 0.1 g/l Cu, or less than 5% of the Cu in the nodules. Thanks to the absence of any significant amount of Cu, the first precipitation step (P1) results in a Co and Ni precipitate nearly free of Cu. Most of the Cu, together with residual Mn, Ni, Co, but also Fe, is dissolved in the second more acidic leaching step (L2).

Second residue (5) is exhausted in leachable metals. It will mainly contain less valuable minerals such as silica and alumina.

It should be noted that a stoichiometric excess of $SO_2$ may be helpful to enhance the yield and the kinetics in the leaching steps (L1, L2). Similarly, a stoichiometric excess of sulfides may be helpful to enhance the yield and the kinetics of the precipitation reactions in P1.

The expression "major part", when related to an element, designates a fraction of more than 50 weight % of that element, with respect to its total amount fed to the process.

According to an advantageous embodiment, the process further comprises the step of:
first precipitation (P1) of Ni and Co from the first leach solution (2), using a first sulfide precipitation agent (14), at a pH of 2 to 4, thereby obtaining a Mn-bearing aqueous phase (6) and a Ni- and Co-bearing solid phase (7), which are separated. The first sulfide precipitation agent (14) is preferably $H_2S$.

Sulfide precipitation is indeed selective towards Ni, and Co, but any Cu will unavoidably also precipitate. The low Cu content of the solution ensures that a concentrated Ni and Co product is obtained, nearly free of Cu. Such a product is suitable in applications where Cu is undesired, such as for the manufacture of cathode materials for Li-ion batteries.

According to an advantageous embodiment, the process further comprises the steps of:
second precipitation (P2) of Cu from the second leach solution (4), using a second sulfide precipitation agent (15), at a pH of 0.5 to 1.5, thereby obtaining a metal-bearing aqueous phase (8) and a Cu-bearing solid phase (9), which are separated; and,
recirculation of a major part of the metal-bearing aqueous phase (8) to the first leaching step (L1), for use as the first acidic aqueous solution (11). The second sulfide precipitation agent (15) is preferably $H_2S$ and/or a mixture of elemental sulfur and $SO_2$.

Cu can be selectively precipitated from the obtained second leach solution (4), thus leaving Mn, Ni, Co, but also Fe as solutes in the metal-bearing aqueous phase (8).

The recirculation of this metal-bearing aqueous phase (8) to the first leaching step (L1) has several benefits. As described above, most of the residual Mn, Ni and Co metal that is not leached in the first step (L1) will dissolve in the more acidic second leach (L2). These 3 recovered metals will be recirculated to the first leaching step (L1) and will report to the first leach solution (2). An advantage of this embodiment is thus the enhanced yield. An even more pronounced yield enhancement is obtained for Fe, in particular as Fe is mainly dissolved in the second leaching step (L2). Fe follows the path of Mn, which is beneficial as both elements find a common use in the steel industry. A further advantage is that the recirculated metal-bearing aqueous phase (8) provides for at least part of the acid consumed by the nodules in the first leaching step (L1). The pH of the second leach solution (4) should preferably not be below 0.5 in case of recirculation, as the acid needs of the first leaching step (L1) may otherwise be exceeded.

The expression "major part", when related to a stream, designates a fraction of more than 50 volume % of that stream.

According to an advantageous embodiment, the process further comprises the steps of:
crystallization of the Mn from the Mn-bearing phase (6) by heating and/or by evaporation of water, thereby obtaining a Mn-bearing solid, which is separated;
pyrolysis of the Mn-bearing solid by heating at a temperature of more than 550° C., preferably more than 850° C., thereby forming Mn oxide and an $SO_2$-bearing gas, which is separated; and
recirculation of the $SO_2$-bearing gas to either one or both leaching steps (L1, L2) for use as leaching agent (10, 12).

It is preferred to crystallize the dissolved manganese as sulfate and/or dithionate, and to subject it to pyrolysis, thereby producing a mixture of $SO_2$ and $SO_3$ that is suitable for recirculation to the leaching stages. Decomposition may start at 550° C. when a reducing agent such as coal is admixed; otherwise a temperature of at least 850° C. is needed. Mn represents by far the most abundant metal in typical nodules. Recirculating the sulfur present in the manganese sulfate and/or dithionate will therefore fulfill the needs of the leaching stages to a large extent.

According to an advantageous embodiment, an excess of $SO_2$-bearing gas is fed as leaching agent (12) to the second leaching step (L2), thereby obtaining a stream of unreacted $SO_2$, for use as leaching agent (10) in the first leaching (L1) step.

The skilled person will readily determine the amounts of acid and of sulfur dioxide needed in the leaching steps based on the stoichiometry according to the below-mentioned reactions. In a preferred embodiment, a stoichiometric excess of $SO_2$ is introduced in the second leaching stage (L2) only. The excess will leave the reactor of the second leaching stage (L2). It is circulated to the first leaching step (L1).

According to an advantageous embodiment, the $SO_2$-bearing gas also contains $SO_3$.

By $SO_2$-bearing gas is meant a gas that contains a significant amount of $SO_2$, preferably more than 10% by volume, more preferably more than 40%. The volume of $SO_2$-bearing gas to be injected in the leaching steps could otherwise become impractical. Other main constituents of the gas may comprise $N_2$, and the combustion products of the fuel used in the step of pyrolysis of the Mn-bearing solid.

The mixture of $SO_2$ and $SO_3$ may be obtained from an external source such as from the combustion of sulfur. In that specific case, the mixture will primarily contain $SO_2$ and only traces of $SO_3$.

The amount of $SO_2$ needed is essentially dictated by the leaching stoichiometry. In the first leaching step at a pH of 2 to 4, a major part of each of Ni, Mn, and Co reacts according to:

$$MnO_2 + SO_2 \rightarrow MSO_4 \text{ and, } MnO_2 + 2SO_2 \rightarrow MnS_2O_6$$

$$NiO + H_2SO_4 \rightarrow NiSO_4 + H_2O$$

$$CoO + H_2SO_4 \rightarrow CoSO_4 + H_2O$$

With respect to the feed to the process, the major part of the Ni, Mn, and Co, is leached. Cu remains essentially in the first residue, together with minor amounts of Ni, Mn, and Co. In the second leaching step, at a pH below 1.5, almost all undissolved Ni, Mn, and Co will dissolve, as well as Cu according to:

$$MnO_2 + SO_2 \rightarrow MnSO_4 \text{ and } MnO_2 + 2SO_2 \rightarrow MnS_2O_6$$

$$NiO + H_2SO_4 \rightarrow NiSO_4 + H_2O$$

$$CoO + H_2SO_4 \rightarrow CoSO_4 + H_2O$$

$$CuO + H_2SO_4 \rightarrow CuSO_4 + H_2O$$

With respect to the feed to the process, the major part of the Cu is leached. The minor amounts of Ni, Mn, and Co left in the first residue are recovered in this step. The second residue is thus depleted in Ni, Mn, Co, and Cu.

In an optional pyrolysis, a mixture of $SO_2$ and $SO_3$ is produced according to the reactions:

$$MnSO_4 \rightarrow MnO_2 + SO_2$$

$$MnS_2O_6 \rightarrow MnO_2 + 2SO_2$$

$$2SO_2 + O_2 \rightarrow 2\ SO_3.$$

Some impurities such as Na, K, and Mg may accumulate with time when the process is run continuously using recirculation. This problem is solved according to known means by providing a bleed stream, thereby limiting the fraction of the recirculated amount so somewhat less than 100%. The bleed stream is treated separately for removal of impurities; it will however also contain some sulfur-bearing species. This loss of sulfur is relatively minor but could be compensated by adding $SO_2$, $SO_3$, or sulfuric acid from external sources.

EXAMPLE 1

This Example illustrates the two-step leaching process without recirculation of the metal-bearing aqueous phase (8). The first leaching step (L1) is therefore performed in an essentially pure aqueous acidic solution.

In the first leaching step (L1), 1 kg (dry) ground nodules having a mean particle diameter (D50) of 100 μm, is blended in 3.9 L of a slightly acid solution containing 18 g/L $H_2SO_4$. The slurry is continuously stirred (500 rpm) and heated to 95° C. For 1.5 hours, $SO_2$ gas, for a total amount of 550 g, is injected into the slurry. At the end of the reaction and after obtaining a pH of 3, the slurry is separated by filtration. The residue (3) is fully washed with water and dried.

In the second leaching step (L2), the residue (3) is repulped in 1.52 L water. The slurry is continuously stirred (500 rpm) and heated to 80° C. For 1.5 hours, a total amount of 400 g $SO_2$ and 150 g $H_2SO_4$ are gradually added to the slurry. About 100 g $SO_2$ gas is effectively consumed. At the end of the reaction and after obtaining pH 0.9, the slurry is separated by filtration. The residue (5) is fully washed with water and dried.

The filtrate (2) of the first leaching step is treated for precipitation of Ni and Co (P1). To this end, the filtrate is brought to 80° C. and is continuously stirred (300 rpm) while blowing Ar over the liquid surface. For the 3.9 L filtrate, 363 mL NaSH (34 g S/L) is needed to precipitate Ni and Co (i.e. 160% of the stoichiometric needs for Ni, Co, Cu, and Zn). NaSH is slowly added at 2 g/min. The slurry is filtrated, and the solids are washed with water and dried in a vacuum stove at 40° C.

The filtrate (4) of the second leaching step is similarly treated for precipitation of Cu (P2). To this end, the filtrate is heated to 60° C. and is continuously stirred (300 rpm) while blowing Ar over the liquid surface. Cu is precipitated by slowly adding 162 mL NaSH (34 g S/L) to 1.75 L filtrate (i.e. 100% of the stoichiometric needs for Cu) at 2 g/min. The slurry is filtrated, and the solids are washed with water and dried in a vacuum stove at 40° C.

The metal composition and quantity of the different filtrates and residues are given in Table 1A. The yields are reported in Table 1B.

TABLE 1A

Elemental analysis of streams according to Example 1

| Stream N° | Stream Type | Weight (g) | Volume (L) | Weight % (solids) or g/L (liquids) | | | | | | |
|---|---|---|---|---|---|---|---|---|---|---|
| | | | | Mn | Ni | Co | Cu | Fe | Si | Al |
| 1 | Nodules | 1000 | | 29 | 1.3 | 0.25 | 1.2 | 6.2 | 6.3 | 2.7 |
| 2 | Filtrate | | 4.76 | 53 | 2.3 | 0.46 | 0.03 | 2.9 | 0 | 0.2 |
| 3 | Residue | 440 | | 9.2 | 0.56 | 0.09 | 2.7 | 11 | 14 | 5.9 |
| 4 | Filtrate | | 2.09 | 18 | 1.1 | 0.15 | 5.2 | 17 | 0 | 1.5 |
| 5 | Residue | 290 | | 1.0 | 0.09 | 0.02 | 0.33 | 4.2 | 22 | 7.9 |
| 6 | Filtrate | | 4.67 | 53 | 0 | 0 | 0 | 3 | 0 | 0.23 |
| 7 | Residue | 25 | | 10 | 43 | 9 | 0 | 3 | 0 | 0 |
| 8 | Filtrate | | 2.09 | 18 | 1.1 | 0.15 | 0.0 | 17 | 0.0 | 1.5 |
| 9 | Residue | 16 | | 0 | 0 | 0 | 66 | 0 | 0 | 0 |

TABLE 1B

Yield vs. process inputs of leaching steps according to Example 1

| Step | Yield (%) vs. Nodules | | | | | | |
|---|---|---|---|---|---|---|---|
| | Mn | Ni | Co | Cu | Fe | Si | Al |
| L1 | 86 | 81 | 85 | 1 | 22 | 0 | 4 |
| L2 | 13 | 17 | 13 | 91 | 59 | 0 | 34 |

During the first leaching step, Mn, Ni and Co are selectively leached vs. Cu (resp. 86%, 81% and 85% vs. 1%). The first leach solution (2) is therefore nearly Cu-free. This is advantageous, as any Cu would unavoidably precipitate even before Ni and Co in the first sulfide precipitation step (P1). A pure Ni and Co sulfide is thus obtained.

In the second sulfide precipitation step (P2), the proper dosing of sulfides easily achieves the selective precipitation of Cu, while Co and Ni remain in solution. A pure Cu sulfide is thus obtained.

EXAMPLE 2

This Example illustrates the two-step leaching process with recirculation of the metal-bearing aqueous phase (8). The first leaching step (L1) is therefore performed in an aqueous acidic solution also containing significant quantities of solutes. It is assumed that the process operates in a continuous way and that equilibrium conditions have been reached.

In the first leaching step (L1), 1 kg (dry) ground nodules having a mean particle diameter (D50) of 100 μm is blended in 2.09 L of filtrate (8) from P2, to which 1.81 L water is added. The slurry is continuously stirred (500 rpm) and heated to 95° C. For 1.5 hours, $SO_2$ gas, for a total of 550 g, is injected into the reactor. At the end of the reaction and after obtaining pH 3, the slurry is separated by decantation.

The underflow (3), which contains the solid residue as such and permeating liquid, resp. tagged as 3S and 3L in Table 2A, is fed to the second leaching step. The overflow 5 goes to the first precipitation step.

In the second leaching step (L2), 0.22 L water is added to the underflow (3). The slurry is continuously stirred (500 rpm) and heated to 80° C. For 1.5 hours, a total amount of 400 g $SO_2$ and 150 g $H_2SO_4$ are gradually added to the slurry. About 100 g $SO_2$ gas is effectively consumed. At the end of the reaction and after obtaining pH 0.9, the slurry is separated by filtration. The residue (5) is fully washed with water and dried.

The filtrate (2) of the first leaching step is treated for precipitation of Ni and Co (P1). To this end, the filtrate is brought to 80° C. and is continuously stirred (300 rpm) while blowing Ar over the liquid surface. For the 3.11 L filtrate, 428 mL NaSH (34 g S/l) is needed to precipitate Ni and Co (i.e. 160% of the stoichiometric needs for Ni, Co, Cu, and Zn). NaSH is slowly added at 1 g/min. The slurry is filtrated, and the solids are washed with water and dried in a vacuum stove at 40° C.

The filtrate (4) of the second leaching step is similarly treated for precipitation of Cu (P2). To this end, the filtrate is heated to 60° C. and is continuously stirred (300 rpm) while blowing Ar over the liquid surface. Cu is precipitated by slowly adding 163 mL NaSH (34 g S/l) to 2.09 L filtrate (i.e. 100% of the stoichiometric needs for Cu) at 1 g/min. The slurry is filtrated, and the solids are washed with water and dried in a vacuum stove at 40° C. The metal-bearing aqueous phase (8) is re-used in the first leaching step.

The metal composition and quantity of the different filtrates and residues are given in Table 2A. The yields are reported in Table 2B.

TABLE 2A

Elemental analysis of streams according to Example 2

| Stream N° | Stream Type | Weight (g) | Volume (L) | Mn | Ni | Co | Cu | Fe | Si | Al |
|---|---|---|---|---|---|---|---|---|---|---|
| 1 | Nodules | 1000 | | 29 | 1.3 | 0.25 | 1.2 | 6.2 | 6.3 | 2.7 |
| 2 | Filtrate | | 3.11 | 92 | 4.1 | 0.78 | 0.03 | 16.0 | 0 | 1.3 |
| 3S | Residue | 440 | | 9.2 | 0.56 | 0.09 | 2.7 | 11 | 14 | 5.9 |
| 3L | Filtrate | | 1.56 | 92 | 4.1 | 0.78 | 0.03 | 16.0 | 0 | 1.3 |
| 4 | Filtrate | | 2.09 | 87 | 4.1 | 0.73 | 5.2 | 29 | 0 | 2.5 |
| 5 | Residue | 290 | | 1.0 | 0.09 | 0.02 | 0.33 | 4.2 | 22 | 7.9 |
| 6 | Filtrate | | 3.11 | 91 | 0 | 0 | 0 | 15 | 0 | 1.35 |
| 7 | Residue | 32 | | 9 | 40 | 8 | 0 | 8 | 0 | 0 |
| 8->11 | Filtrate | | 2.09 | 87 | 4.1 | 0.73 | 0.0 | 29 | 0.0 | 2.5 |
| 9 | Residue | 16 | | 0 | 0 | 0 | 66 | 0 | 0 | 0 |

TABLE 2B

Yield vs. process inputs of leaching steps according to Example 2

| | Yield (%) vs. Nodules | | | | | | |
|---|---|---|---|---|---|---|---|
| Step | Mn | Ni | Co | Cu | Fe | Si | Al |
| L1 | 86 | 81 | 85 | 1 | 22 | 0 | 4 |
| L2 | 13 | 17 | 13 | 91 | 59 | 0 | 12 |

Example 2 demonstrates the advantages of using recirculation when compared to the two-step leaching without recirculation according to Example 1:

enhanced global (L1+L2) yields for Mn, Ni, and Co, reaching respectively 99%, 98%, and 98%;

increased recovery of Fe, in particular thanks to the second leaching step, resulting in a global recovery (L1+L2) of 81%;

reduced acid consumption, as the acid needed in the first leaching step is provided by the recirculated metal-bearing aqueous phase (8).

The invention claimed is:

1. Process for the recovery of the metals Mn, Ni, Co, and Cu from polymetallic nodules, comprising the steps of leaching said metals using an $SO_2$-bearing gas as leaching agent in acidic aqueous conditions, wherein the leaching is performed according to a two-stage process comprising the steps of:

a first leaching (L1), wherein a major part of the Mn, Ni, and Co is dissolved by contacting the nodules with a first quantity of $SO_2$-bearing gas in a first acidic aqueous solution of sulfuric acid at a pH of 2 to 4, thereby producing a first leach solution and a first leach residue, which are separated; and, a second leaching (L2), wherein a major part of the Cu is dissolved by contacting the first leach residue with a second quantity of $SO_2$-bearing gas in a second acidic aqueous solution of sulfuric acid at a pH of less than 1.5, thereby producing a second leach solution and a second residue, which are separated, wherein the process further comprises:

crystallization of the Mn from the Mn-bearing phase by heating and/or by evaporation of water, thereby obtaining a Mn-bearing solid, which is separated;

pyrolysis of the Mn-bearing solid by heating at a temperature of more than 850° C. thereby forming Mn oxide and an $SO_2$-bearing gas, which is separated; and recirculation of the $SO_2$-bearing gas to either one or both leaching steps (L1, L2) for use as leaching agent, wherein an excess of $SO_2$-bearing gas is fed as leaching agent to the second leaching step (L2), thereby obtaining a stream of unreacted $SO_2$, for use as leaching agent in the first leaching (L1) step.

2. Process according to claim 1, wherein the $SO_2$-bearing gas also contains $SO_3$.

3. Process according to claim 1, further comprising the steps of:

first precipitation of Ni and Co from the first leach solution, using a first sulfide precipitation agent, at a pH of 2 to 4, thereby obtaining a Mn-bearing aqueous phase and a Ni- and Co-bearing solid phase, which are separated.

4. Process according to claim 3, wherein the first sulfide precipitation agent is $H_2S$.

5. Process according to claim 1, further comprising the steps of:
  second precipitation (P2) of Cu from the second leach solution, using a second sulfide precipitation agent, at a pH of 0.5 to 1.5, thereby obtaining a metal-bearing aqueous phase and a Cu-bearing solid phase, which are separated; and,
  recirculation of a major part of the metal-bearing aqueous phase to the first leaching step (L1), for use as the first acidic aqueous solution.

6. Process according to claim 5, wherein the second sulfide precipitation agent is $H_2S$ and/or a mixture of elemental sulfur and $SO_2$.

* * * * *